Oct. 15, 1929.  E. B. SNEAD  1,732,033

CABLE CLAMP

Filed Nov. 19, 1928

WITNESSES

INVENTOR
*Edwin B. Snead*
BY
ATTORNEY

Patented Oct. 15, 1929

1,732,033

UNITED STATES PATENT OFFICE

EDWIN B. SNEAD, OF DALLAS, TEXAS

CABLE CLAMP

Application filed November 19, 1928. Serial No. 320,434.

This invention relates to cable clamps.

It is among the objects of the present invention to provide a cable clamp which is simple in operation and strong and durable, and which may be formed in conformity with the requirements of economic manufacture.

With the above and other objects in view, the invention includes a cable-receiving body member having bifurcated portions which are adapted to receive therein a clamping piece, the opposite end of which extends through an aperture in the body and which is adapted for threaded engagement to control the tension applied to cables received therethrough.

Numerous other objects and features of the invention will be apparent from a consideration of the present specification taken in connection with the accompanying drawings, in which Figure 1 is a perspective view of one form of my present invention;

Figure 1:
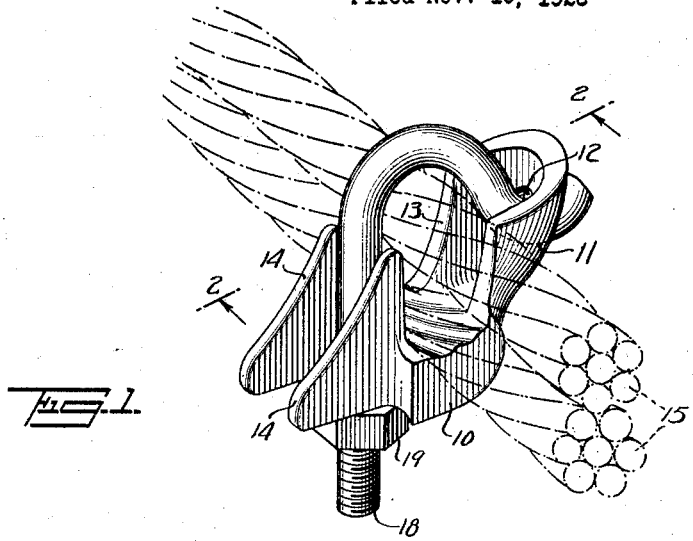
Figure 2:
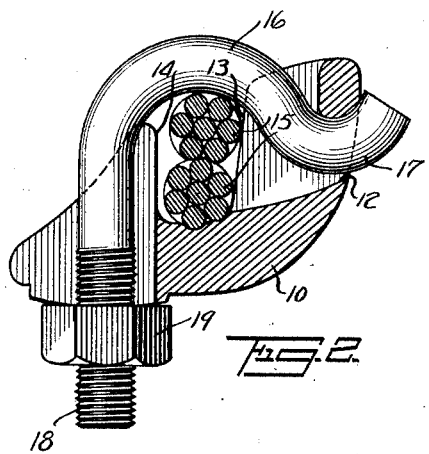
Fig. 2 is a sectional view taken on the line 2—2 of Fig. 1.
Figure 3:
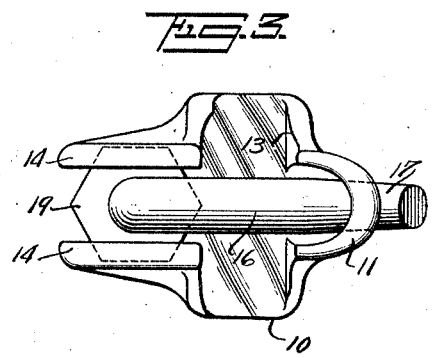
Fig. 3 is a top plan view of the invention as illustrated in Figs. 1 and 2.

Referring more particularly to Figs. 1, 2 and 3, the form of the invention herein illustrated includes a base 10, including a side flange 11 apertured as at 12 and substantially U-shape in cross section, the inner side thereof forming cable-embracing walls 13. The opposite side of the base 10 is provided with a vertically extending bifurcated member 14, the inner edges of the furcations of which co-operate with the sides 13 of the flange 11 to form therebetween a trough substantially U-shape, adapted to receive one or more cables, as illustrated at 15 in Figs. 1 and 2.

For retaining the cables 15 between the side walls 13 and 14 and against the face of the base member 10, a cable-retaining member 16 is provided, preferably formed of round metal stock, one end being hooked as at 17 to be received through the aperture 12, while the member 16 curves upwardly therefrom and then straight downwardly to a threaded extremity 18, adapted to receive for threaded engagement and adjustment thereof, a nut 19. The downward straight portion of the member 16 is adapted to be received between the furcations of the member 14, the nut 19 abutting the lower straight face thereof for retaining the member 16 in engagement with the body 10 with its hooked extremity through the aperture 12 and thus retaining the cables between the side walls 13 and 14.

In this form of the invention, it will be readily seen that upon loosening the nut 19, a pivotal movement of the portion 17 of the member 16 with respect to the aperture 12, may take place. The member 16 is swung outwardly to release it from the furcations of the member 14 and to permit the hooked end 17 to be withdrawn from the aperture 12. The cables 15 may then be readily placed between the side walls 13 and 14, and by a simple pivotal movement after the hooked end 17 been positioned through the aperture 12, the device may assume the position illustrated in Figs. 1, 2 and 3. Adjustment of the nut 19 will effect an adjustment of the tension upon the cables 15, and will, at the same time, prevent accidental displacement of the member 16 with respect to the base 10. Thus the device provides a simple and economic construction, readily adjustable for various sizes and numbers of cables.

Figure 4:
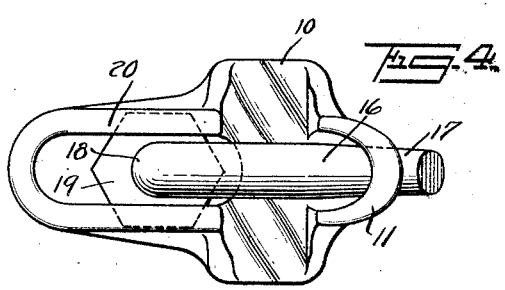
Fig. 4 is a perspective view of a modified form of the invention.

Referring more particularly to Fig. 4, the form of the invention herein illustrated includes the base 10, side 11 and retaining member 16, with the hooked end 17, threaded end 18 and nut 19. In this form of the invention, however, the furcations of the member 14 are displaced by the provision of an apertured side member 20, through which the threaded end 18 extends and upon the bottom face of which the nut 19 abuts. In this form of the invention, it may readily be seen that the nut 19 must be removed before removal of the engaging member 16 may be accomplished, thus insuring the prevention of accidental displacement or loss of the engaging member 16.

In connection with the present invention it will be readily understood that numerous changes and modifications and the full use of equivalents may be resorted to without departing from the spirit or scope of the present invention as outlined in the appended claim.

What is claimed is:

A cable clamp, comprising a body having a cable-receiving recess therein, an upwardly projecting integral member on the body forming one wall of said recess and approximately V-shape in plan and having an opening in its outer wall, said body having upwardly projecting spaced integral members forming the other wall of said recess, a clamping member constituting a rod having a hooked end projected through said opening, upwardly bowed intermediate its ends for accommodation and engagement with a cable in the recess, and having a downwardly projecting straight portion located between the spaced members, and a nut screwed onto the lower end of the rod and engaging the body.

Signed at Dallas in the county of Dallas and State of Texas, this 14th day of November A. D. 1928.

EDWIN B. SNEAD.